(12) United States Patent
Elder

(10) Patent No.: US 8,784,047 B2
(45) Date of Patent: Jul. 22, 2014

(54) GAS TURBINE ENGINE HEAT EXCHANGER WITH TAPERED FINS

(75) Inventor: James S. Elder, South Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 822 days.

(21) Appl. No.: 12/939,243

(22) Filed: Nov. 4, 2010

(65) Prior Publication Data

US 2012/0114467 A1 May 10, 2012

(51) Int. Cl.
    *F04D 29/58* (2006.01)
(52) U.S. Cl.
    USPC ........... 415/178; 415/116; 415/175; 60/226.1
(58) Field of Classification Search
    USPC ......... 415/115, 116, 175, 176, 177, 178, 179, 415/180; 165/181, 183
    See application file for complete search history.

(56) References Cited

U.S. PATENT DOCUMENTS

| 4,254,618 | A  | * | 3/1981 | Elovic | 60/226.1 |
| 5,709,263 | A  |   | 1/1998 | Mira |  |
| 6,234,239 | B1 |   | 5/2001 | Azar |  |
| 6,925,829 | B2 |   | 8/2005 | Wei |  |
| 7,337,831 | B2 | * | 3/2008 | Torii | 165/109.1 |
| 7,509,995 | B2 | * | 3/2009 | Bhatti et al. | 165/80.3 |
| 8,181,443 | B2 | * | 5/2012 | Rago | 60/226.1 |
| 2001/0003302 | A1 |   | 6/2001 | Azar |  |
| 2008/0030957 | A1 |   | 2/2008 | Abul-Haj et al. |  |
| 2008/0053060 | A1 | * | 3/2008 | Olver | 60/226.1 |
| 2008/0074842 | A1 |   | 3/2008 | Tracy et al. |  |
| 2008/0095611 | A1 | * | 4/2008 | Storage et al. | 415/116 |

FOREIGN PATENT DOCUMENTS

| GB | 2 481 129 A |   | 12/2011 |
| JP | 2000121272  |   | 4/2000  |
| JP | 2001332883 A | * | 11/2001 |
| RU | 2 182 692 C1 |   | 5/2002  |

OTHER PUBLICATIONS

JP 2001-332883 translation provided by AIPN.*
RU 2182692 translation provided by WIPO.*
United Kingdom Search Report for GB Application No. GB1120077.1, Jan. 31, 2012.

* cited by examiner

*Primary Examiner* — Ned Landrum
*Assistant Examiner* — Justin Seabe
(74) *Attorney, Agent, or Firm* — Carlson, Gaskey & Olds, P.C.

(57) ABSTRACT

A heat exchanger for a gas turbine engine includes first and second opposing sides enclosing a cavity. A first set of fins is supported on the first side and arranged outside the cavity. The fins have leading and trailing edges respectively including first and second heights. The first height is less than the second height. In one application, the heat exchanger is arranged in a gas turbine engine. A core is supported relative to a fan case. The core includes a core nacelle and a fan case. A fan duct is provided between the core nacelle and the fan case. A heat exchanger includes fins arranged in a fan duct. The fins are oriented such that the shorter leading edge faces into the airflow.

7 Claims, 2 Drawing Sheets

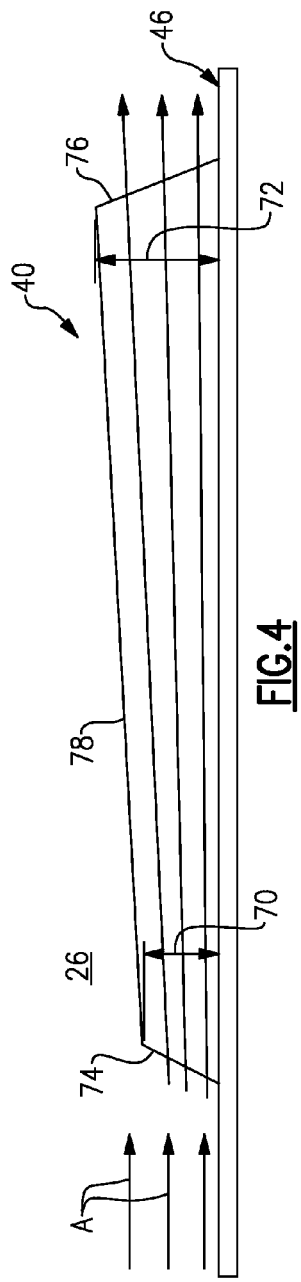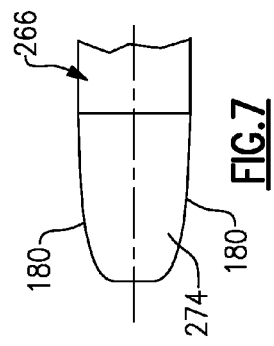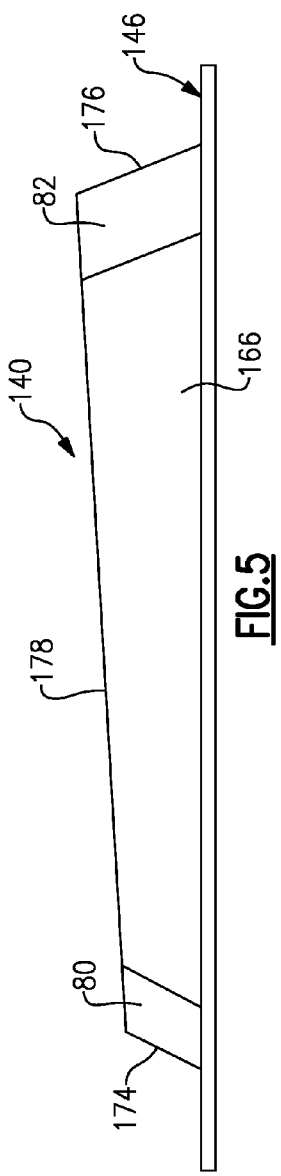

GAS TURBINE ENGINE HEAT EXCHANGER WITH TAPERED FINS

BACKGROUND

This disclosure relates to a heat exchanger for use in a gas turbine engine. In one example, the heat exchanger is provided with fins arranged in a fan duct.

One example aircraft gas turbine engine transfers heat from the engine oil circuit to the fan airflow through the use of heat exchangers. In one type of arrangement, multiple heat exchangers are supported by the core in a circumferential location relative to one another.

A common type of heat exchanger includes a structure having an oil cavity with fins extending from the structure into the fan duct to increase the amount of surface area exposed to the fan airflow. Typical construction is provided by machined aluminum halves brazed to one another.

Traditional fin heat exchangers utilize fins with a constant height, length and thickness to transfer heat to the air flowing between the fins. Fins typically have a rectangular shape with a uniform cross-section. Sharp corners of the fins may be relieved to reduce the potential for damage during handling and service.

SUMMARY

A heat exchanger for a gas turbine engine includes first and second opposing sides enclosing a cavity. A first set of fins is supported on the first side and arranged outside the cavity. The fins have leading and trailing edges respectively including first and second heights. The first height is less than the second height.

In one application, the heat exchanger is arranged in a gas turbine engine. A core is supported relative to a fan case. The core includes a core nacelle and a fan case. A fan duct is provided between the core nacelle and the fan case. A heat exchanger includes fins arranged in a fan duct. The fins are oriented such that the shorter leading edge faces into the airflow.

BRIEF DESCRIPTION OF THE DRAWINGS

The disclosure can be further understood by reference to the following detailed description when considered in connection with the accompanying drawings wherein:

FIG. 4 is a side elevational view of a fin on the first side, shown in the heat exchanger in FIGS. 2-3B.

FIG. 5 is another example fin provided on the first side.

FIG. 6 is an enlarged top elevational view of an example leading edge illustrated on the fin shown in FIG. 5.

FIG. 7 is another example of a leading edge.

DETAILED DESCRIPTION

Figure 1:
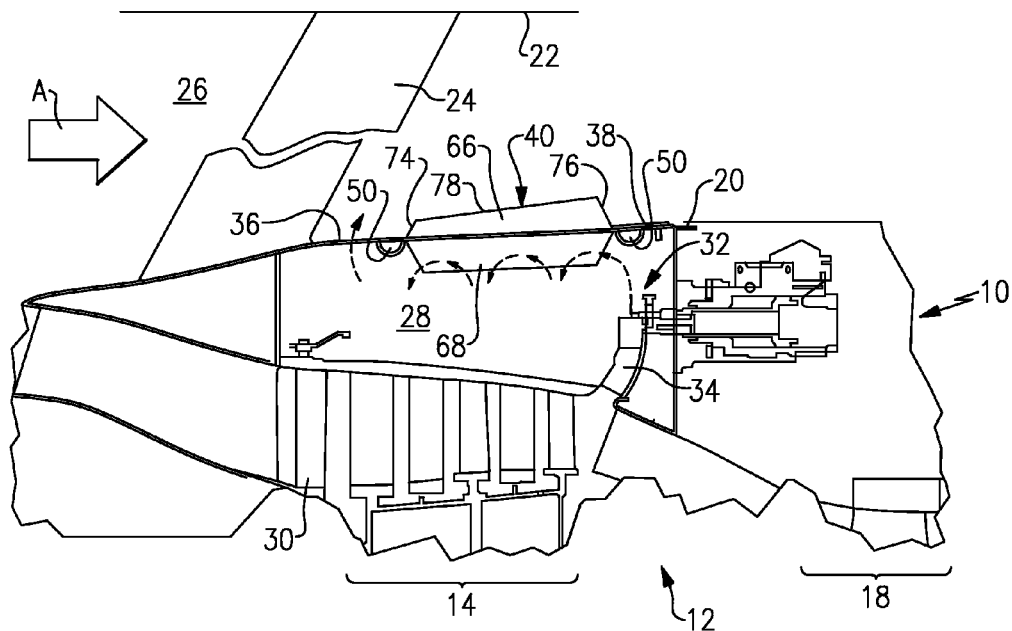
FIG. 1 is a partial schematic view of an example gas turbine engine with an example heat exchanger.

A portion of a gas turbine engine 10 is schematically shown in FIG. 1. The engine 10 includes a core 12 having compressor, combustor and turbine sections. The core 12 is supported relative to a fan case 22 by flow exit guide vanes 24. The core 12 includes a core nacelle 20 surrounding the compressor, combustor and turbine sections. The compressor section includes a low pressure compressor 14 and a high pressure compressor 18. A fan duct 26 is provided between the fan case 22 and core nacelle 20. A fan (not shown) is driven by the core 12 and produces an airflow A through the fan duct 26.

A bleed cavity 28 is provided within the core nacelle 20 and is arranged radially outward of the compressor section. In one example, a variable stator vane 30 is provided in the compressor section. An actuation system 32 is arranged within the bleed cavity 28 for actuating the variable stator vanes 30 during engine operation. A bleed cavity inlet 34 communicates bleed air from the compressor section to the bleed cavity 28. Fluid flows from the bleed cavity inlet 34 through the bleed cavity 28 and exits a bleed cavity outlet 36 to the fan duct 26.

Figure 2:
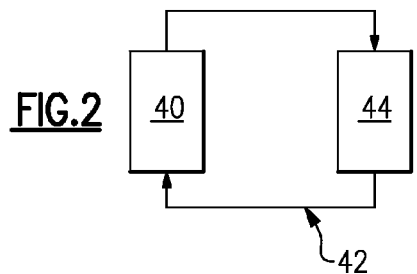
FIG. 2 is a schematic of a gas turbine engine cooling circuit utilizing the heat exchanger.

In one example, the core nacelle 20 includes an aperture 38 within which a fluid heat exchanger 40 is mounted. In one example, the heat exchanger 40 is part of an oil cooling circuit 42 that cools oil from a heat load 44, such as an oil bearing compartment, as schematically illustrated in FIG. 2.

Figures 3A, 3B:
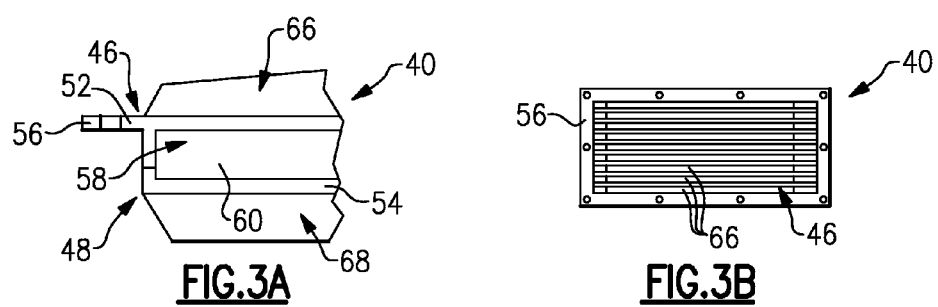
FIG. 3A is a partial cross-sectional view of an example heat exchanger, also shown in FIG. 2.
FIG. 3B is a top elevational view of a first side of the heat exchanger shown in FIG. 3A.

Referring to FIGS. 1, 3A and 3B, the heat exchanger 40 includes first and second opposing sides 46, 48. An oil cavity 58 is provided between a first and second portions 52, 54 that are brazed to one another. In one example, internal fins 60 are provided in the cavity 58. In one example, the first portion 52 provides a mounting flange 56 for securing the heat exchanger 40 to the core nacelle 20 and within the aperture 38. The heat exchanger 40 may also support oil manifolds 50 that communicate oil between the heat load 44 and the cavity 58.

First and second sets of fins 66, 68 are respectively provided on the first and second sides 46, 48 and extending axially in the direction of airflow A. The first set of fins 66 is arranged in the fan duct 26, and the second set of fins 68 is arranged in the bleed cavity 28. The fins 66 taper radially outwardly from and generally perpendicular to the first side 46 as they extend in a direction away from the fan (not shown). The fins 66 include leading and trailing edges 74, 76 opposite one another with the leading edge 74 facing the airflow A and forward of the trailing edge 76.

The leading and trailing edges 74, 76 respectively include first and second heights 70, 72, which are perpendicular to the first side 46, as illustrated in FIG. 4. The first height 70 is smaller than the second height 72. The tapered design reduces the air-side pressure loss, which improves airflow through the fins 66 and reduces fuel consumption.

In one example, an outer edge 78 extends from the leading edge 74 to the trailing edge 76 and is generally linear, for example. In the example, the leading and trailing edges each include a length, with the length of the leading edge shorter than the length of the trailing edge. The leading and trailing edges 74, 76 taper toward one another as they extend radially outward from the first side 46. In the example shown, the fins 66 are generally trapezoidal in shape when viewed from a circumferential side, as best shown in FIG. 4.

Another example heat exchanger 140 is illustrated in FIG. 5. The heat exchanger 140 includes fins 166 extending from a first side 146. The leading edge 174 is shorter than the trailing edge 176 in a radial direction, as is the fin 66 in FIG. 4. In the example in FIG. 5, both the leading and trailing edges 174, 176 taper in cross-section and respectively include tapered surfaces 80, 82. As illustrated in FIG. 6, the tapered surfaces 80 are generally unparallel and flat. Another example leading edge 174 of a fin 266 is illustrated in FIG. 7, which includes rounded lateral surfaces 180.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
a core supported relative to a fan case, the core including a core nacelle, and a fan duct provided between the core nacelle and the fan case, wherein the core includes a compressor section and a bleed cavity is provided within the core and configured to be shielded from a fan airflow and in fluid communication with the compressor section; and
a heat exchanger having a plate extending a length and supporting fins that are arranged in the fan duct, the fins extending substantially the length in a longitudinal direction from a leading edge of the fin to a trailing edges of the fin, the leading and trailing edges respectively including first and second heights, the leading edge arranged upstream from the trailing edge, the first height less than the second height, the heat exchanger including first and second sides opposite one another, the first side including the fins configured to be exposed to the fan airflow flow, and the second side including another set of fins exposed to the bleed cavity and configured to be shielded from the fan airflow.

2. The gas turbine engine according to claim 1, further comprising flow exit guide vanes, wherein the heat exchanger is arranged downstream from the flow exit guide vanes.

3. The gas turbine engine according to claim 1, comprising an oil cooling circuit including the heat exchanger and a heat load, the heat exchanger including an oil cavity between the first and second sides.

4. The gas turbine engine according to claim 3, wherein the oil cavity has internal fins oriented in an axial direction that is the same direction in which the fins extend.

5. The gas turbine engine according to claim 1, wherein the fins include an outer edge adjoining the leading and trailing edges, and the fins include a generally trapezoidal shape provided by the leading and trailing edges and the outer edge.

6. The gas turbine engine according to claim 1, wherein the leading and trailing edges each include a length, the length of the leading edge shorter than the length of the trailing edge.

7. The gas turbine engine according to claim 1, the first and second heights perpendicular to the first side and different than the lengths.

* * * * *